(12) United States Patent
Spikes

(10) Patent No.: US 10,979,769 B2
(45) Date of Patent: Apr. 13, 2021

(54) METHOD AND APPARATUS FOR MONITORING AND TRACKING CONSUMPTION OF DIGITAL CONTENT

(71) Applicant: PreTechnology, Inc., New York, NY (US)

(72) Inventor: Stacy Spikes, New York, NY (US)

(73) Assignee: PreTechnology, Inc., New York, NY (US)

(*) Notice: Subject to any disclaimer, the term of this patent is extended or adjusted under 35 U.S.C. 154(b) by 0 days.

(21) Appl. No.: 16/799,465

(22) Filed: Feb. 24, 2020

(65) Prior Publication Data
US 2020/0275160 A1 Aug. 27, 2020

Related U.S. Application Data

(60) Provisional application No. 62/810,060, filed on Feb. 25, 2019.

(51) Int. Cl.
*H04N 21/472* (2011.01)
*H04N 21/442* (2011.01)
*H04N 21/4415* (2011.01)

(52) U.S. Cl.
CPC ... *H04N 21/47208* (2013.01); *H04N 21/4415* (2013.01); *H04N 21/44204* (2013.01); *H04N 21/44218* (2013.01)

(58) Field of Classification Search
None
See application file for complete search history.

(56) References Cited

U.S. PATENT DOCUMENTS

| | | | |
|---|---|---|---|
| 10,200,753 B1 | 2/2019 | Hao et al. | |
| 2004/0205810 A1* | 10/2004 | Matheny | H04N 21/8586 725/23 |
| 2004/0255322 A1* | 12/2004 | Meadows | H04N 21/4722 725/23 |
| 2005/0108092 A1* | 5/2005 | Campbell | G06Q 30/0267 705/14.64 |
| 2007/0027755 A1* | 2/2007 | Lee | G06Q 30/0225 705/14.26 |
| 2007/0192784 A1* | 8/2007 | Postrel | G06Q 30/0224 725/23 |

(Continued)

FOREIGN PATENT DOCUMENTS

WO 2017120469 A1 7/2017

OTHER PUBLICATIONS

Patent Cooperation Treaty International Application No. PCT/US2020/019516, "International Search Report and Written Opinion", Applicant ASTN, Inc., dated May 20, 2020.

*Primary Examiner* — Alexander Q Huerta
(74) *Attorney, Agent, or Firm* — Martensen IP; Barbara B. Courtney

(57) ABSTRACT

Embodiments include a system and method for monitoring and tracking consumption of digital content. The system comprises a viewer monitoring system coupled to a plurality of content providers via a network and further coupled to a plurality of users via user devices coupled to the network. A method includes a user downloading an application (app) using an API of the system, the user selecting content to view, and a biometric recognition module of the system determining whether the user is actually viewing the selected content.

21 Claims, 9 Drawing Sheets

(56) References Cited

U.S. PATENT DOCUMENTS

| | | | |
|---|---|---|---|
| 2007/0288952 A1* | 12/2007 | Weinblatt | H04N 21/4784 725/23 |
| 2009/0113417 A1* | 4/2009 | Vrijsen | H04N 5/4403 717/178 |
| 2010/0251281 A1* | 9/2010 | Craner | H04N 7/17318 725/23 |
| 2012/0079521 A1* | 3/2012 | Garg | G06Q 30/02 725/23 |
| 2012/0174146 A1* | 7/2012 | Richard | G06Q 20/24 725/24 |
| 2013/0135198 A1* | 5/2013 | Hodge | G06F 1/3265 345/156 |
| 2013/0145390 A1* | 6/2013 | Sillerman | G06Q 30/0226 725/18 |
| 2013/0205316 A1* | 8/2013 | Sinha | H04N 21/432 725/14 |
| 2013/0247081 A1* | 9/2013 | Vinson | H04N 21/4532 725/14 |
| 2013/0268954 A1 | 10/2013 | Hulten et al. | |
| 2013/0283304 A1* | 10/2013 | Wan | H04H 60/65 725/14 |
| 2014/0325539 A1* | 10/2014 | Moon | G06Q 30/00 725/10 |
| 2016/0042281 A1* | 2/2016 | Cunico | G06K 9/00221 706/11 |
| 2016/0345076 A1* | 11/2016 | Makhlouf | H04N 21/44222 |
| 2017/0195745 A1* | 7/2017 | Kumar Bvn | H04N 21/2387 |
| 2017/0214952 A1 | 7/2017 | Karanth | |
| 2018/0295420 A1* | 10/2018 | Rumreich | H04N 21/422 |
| 2019/0075340 A1* | 3/2019 | Hochart | H04N 21/4532 |

\* cited by examiner

```
mysql> select* from preshow_video_watch_logs;
+----+----------------------------+---------+-------------------+-------------------------+----------+------------+----------------+----------+
| id | created                    | user_id | preshow_video_id  | watch_time_in_millis    | brand_id | watch_type | watch_sub_type | watching |
+----+----------------------------+---------+-------------------+-------------------------+----------+------------+----------------+----------+
|  1 | 2019-10-06 22:25:21.490000 |     481 |                 1 |                       0 |        1 | watch      | eye_tracking   |        1 |
|  2 | 2019-10-06 22:25:39.457000 |     481 |                 1 |                    9457 |        1 | watch      | eye_tracking   |        0 |
|  3 | 2019-10-06 22:25:42.299000 |     481 |                 1 |                    9457 |        1 | watch      | eye_tracking   |        1 |
|  4 | 2019-10-06 22:25:42.359000 |     481 |                 1 |                    9457 |        1 | watch      | eye_tracking   |        0 |
|  5 | 2019-10-06 22:25:42.468000 |     481 |                 1 |                    9457 |        1 | watch      | eye_tracking   |        1 |
|  6 | 2019-10-06 22:25:47.105000 |     481 |                 1 |                   12554 |        1 | watch      | eye_tracking   |        0 |
|  7 | 2019-10-06 22:25:47.168000 |     481 |                 1 |                   12614 |        1 | watch      | eye_tracking   |        1 |
|  8 | 2019-10-06 22:25:49.053000 |     481 |                 1 |                   14504 |        1 | watch      | eye_tracking   |        0 |
|  9 | 2019-10-06 22:25:49.113000 |     481 |                 1 |                   14555 |        1 | watch      | eye_tracking   |        1 |
| 10 | 2019-10-06 22:25:49.291000 |     481 |                 1 |                   14739 |        1 | watch      | eye_tracking   |        0 |
| 11 | 2019-10-06 22:25:50.062000 |     481 |                 1 |                   15505 |        1 | watch      | eye_tracking   |        1 |
| 12 | 2019-10-06 22:25:50.412000 |     481 |                 1 |                   15856 |        1 | watch      | eye_tracking   |        0 |
| 13 | 2019-10-06 22:25:51.095000 |     481 |                 1 |                   16544 |        1 | watch      | eye_tracking   |        1 |
| 14 | 2019-10-06 22:25:51.149000 |     481 |                 1 |                   16594 |        1 | watch      | eye_tracking   |        0 |
| 15 | 2019-10-06 22:25:51.254000 |     481 |                 1 |                   16705 |        1 | watch      | eye_tracking   |        1 |
```

FIG.2A

| | | | | | |
|---|---|---|---|---|---|
| 16 | 2019-10-06 22:25:51.326000 | 481 | 1 | 16777 | 1 watch eye_tracking 0 |
| 17 | 2019-10-06 22:25:52.218000 | 481 | 1 | 17664 | 1 watch eye_tracking 1 |
| 18 | 2019-10-06 22:25:52.272000 | 481 | 1 | 17714 | 1 watch eye_tracking 0 |
| 19 | 2019-10-06 22:25:57.478000 | 481 | 1 | 19085 | 1 watch eye_tracking 1 |
| 20 | 2019-10-06 22:25:57.535000 | 481 | 1 | 19085 | 1 watch eye_tracking 0 |
| 21 | 2019-10-06 22:25:58.689000 | 481 | 1 | 19085 | 1 watch eye_tracking 1 |
| 22 | 2019-10-06 22:25:58.757000 | 481 | 1 | 19085 | 1 watch eye_tracking 0 |
| 23 | 2019-10-06 22:25:59.234000 | 481 | 1 | 19085 | 1 watch eye_tracking 1 |
| 24 | 2019-10-06 22:25:59.287000 | 481 | 1 | 19085 | 1 watch eye_tracking 0 |
| 25 | 2019-10-06 22:26:01.723000 | 481 | 1 | 19085 | 1 watch eye_tracking 1 |
| 26 | 2019-10-06 22:26:01.844000 | 481 | 1 | 19085 | 1 watch eye_tracking 0 |
| 27 | 2019-10-06 22:26:01.905000 | 481 | 1 | 19085 | 1 watch eye_tracking 1 |
| 28 | 2019-10-06 22:26:01.967000 | 481 | 1 | 19085 | 1 watch eye_tracking 0 |
| 29 | 2019-10-06 22:26:02.502000 | 481 | 1 | 19085 | 1 watch eye_tracking 1 |
| 30 | 2019-10-06 22:26:14.119000 | 481 | 1 | 19085 | 1 pause user 1 |
| 31 | 2019-10-06 22:26:14.128000 | 481 | 1 | 19085 | 1 pause eye_tracking 1 |

FIG.2B

| 32 | 2019-10-06 22:26:14.667000 | 481 | | | | |
| 33 | 2019-10-06 22:26:14.721000 | 481 | 1 | 19085 | 1 play | 1 user |
| 34 | 2019-10-06 22:26:16.888000 | 481 | 1 | 19182 | 1 watch | 1 eye_tracking |
| 35 | 2019-10-06 22:26:16.948000 | 481 | 1 | 21214 | 1 watch | 0 eye_tracking |
| 36 | 2019-10-06 22:26:17.717000 | 481 | 1 | 21274 | 1 watch | 1 eye_tracking |
| 37 | 2019-10-06 22:26:17.783000 | 481 | 1 | 22043 | 1 watch | 0 eye_tracking |
| 38 | 2019-10-06 22:26:21.937000 | 481 | 1 | 22103 | 1 watch | 1 eye_tracking |
| 39 | 2019-10-06 22:26:21.992000 | 481 | 1 | 26260 | 1 watch | 0 eye_tracking |
| 40 | 2019-10-06 22:26:22.278000 | 481 | 1 | 26310 | 1 watch | 1 eye_tracking |
| 41 | 2019-10-06 22:26:22.347000 | 481 | 1 | 26602 | 1 watch | 0 eye_tracking |
| 42 | 2019-10-06 22:26:22.519000 | 481 | 1 | 26673 | 1 watch | 1 eye_tracking |
| 43 | 2019-10-06 22:26:22.581000 | 481 | 1 | 26837 | 1 watch | 0 eye_tracking |
| 44 | 2019-10-06 22:26:22.649000 | 481 | 1 | 26899 | 1 watch | 1 eye_tracking |
| 45 | 2019-10-06 22:26:22.689000 | 481 | 1 | 26971 | 1 watch | 0 eye_tracking |
| 46 | 2019-10-06 22:26:25.734000 | 481 | 1 | 27012 | 1 watch | 1 eye_tracking |
| 47 | 2019-10-06 22:26:38.590000 | 481 | 1 | 30030 | 1 completed | 1 user |
| | | | | 30030 | 1 completed | 0 user |

[47 rows x t (0 00 )]

FIG.2C

METHOD AND APPARATUS FOR MONITORING AND TRACKING CONSUMPTION OF DIGITAL CONTENT

RELATED APPLICATIONS

The present patent application claims priority from U.S. Provisional Patent Application No. 62/810,060, filed Feb. 25, 2019, which is incorporated by reference in its entirety herein.

BACKGROUND

Digital content is presented for many reasons and consumed for many reasons. As an example, advertisers commonly present short video advertisements on various user devices. When a user chooses an advertisement to view, a video is played. Often the choice process involves the user clicking on the piece of content. There are various current method of verifying whether users chose a piece of content, including record how many clicks a piece of content receives from any users. But it is not traditionally possible to verify that the content has actually been watched by an individual user who chose the content. In another example, users may be required to view content of an indeterminate length for purposes such as compliance with a professional continuing education requirement or an employer education requirement, etc. Various methods of verifying compliance are currently available, such as including audible codes at unpredictable times during the content presentation. The codes are then entered by the user to prove that the user has consumed the content. However, such methods do not verify that the user actually consumed the content, even if watching the content is part of the requirement being complied with. It is desirable to have a method and apparatus for verifying that a user is actually viewing the video content. It is also desirable to have a method and apparatus for tracking user viewing of content in a manner that is permissible by the user and useful for the content provider (for example to reward users for consuming content and to more effectively focus future content presentations).

BRIEF DESCRIPTION OF THE DRAWINGS

Features and objects of the present invention and the manner of attaining them will become more apparent, and the invention itself will be best understood, by reference to the following description of one or more embodiments taken in conjunction with the accompanying Figures.

The Figures depict embodiments of the present invention for purposes of illustration only. One skilled in the art will readily recognize from the following discussion that alternative embodiments of the structures and methods illustrated herein may be employed without departing from the principles of the invention described herein.

Embodiments of the present invention are hereafter described in detail with reference to the accompanying Figures. Although the invention is described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
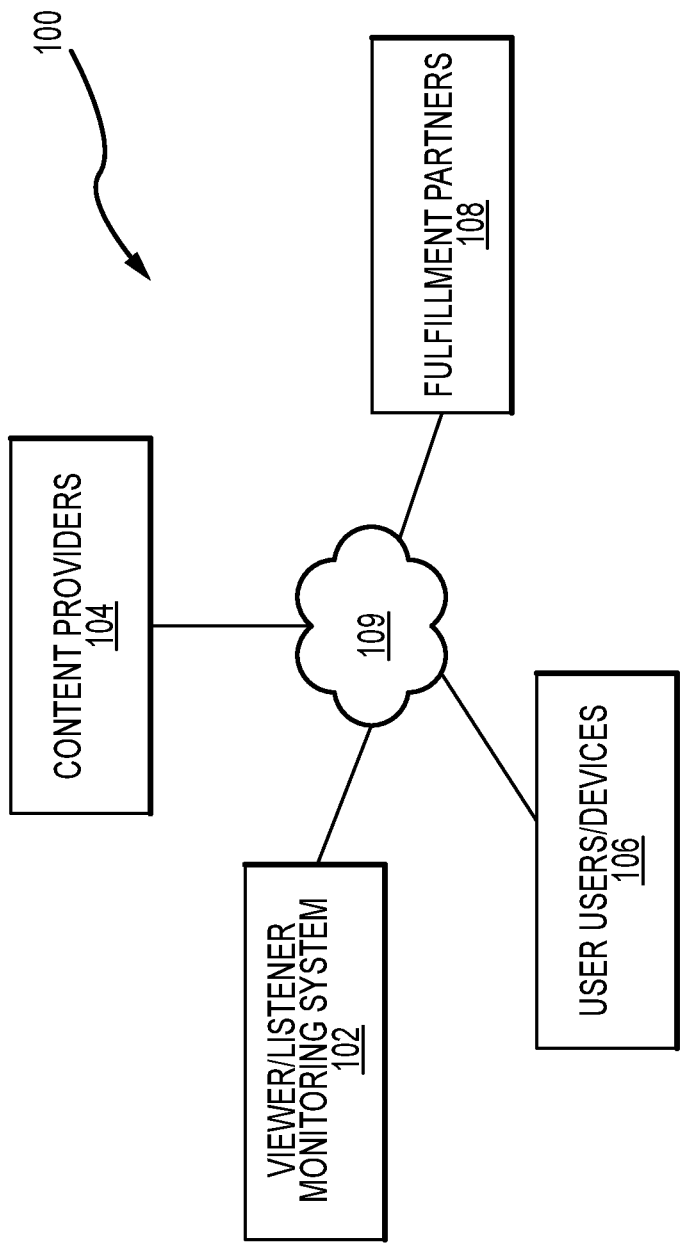

FIG. 1 is a block diagram of an environment within which embodiments of the system operate according to an embodiment.

Figure 2:
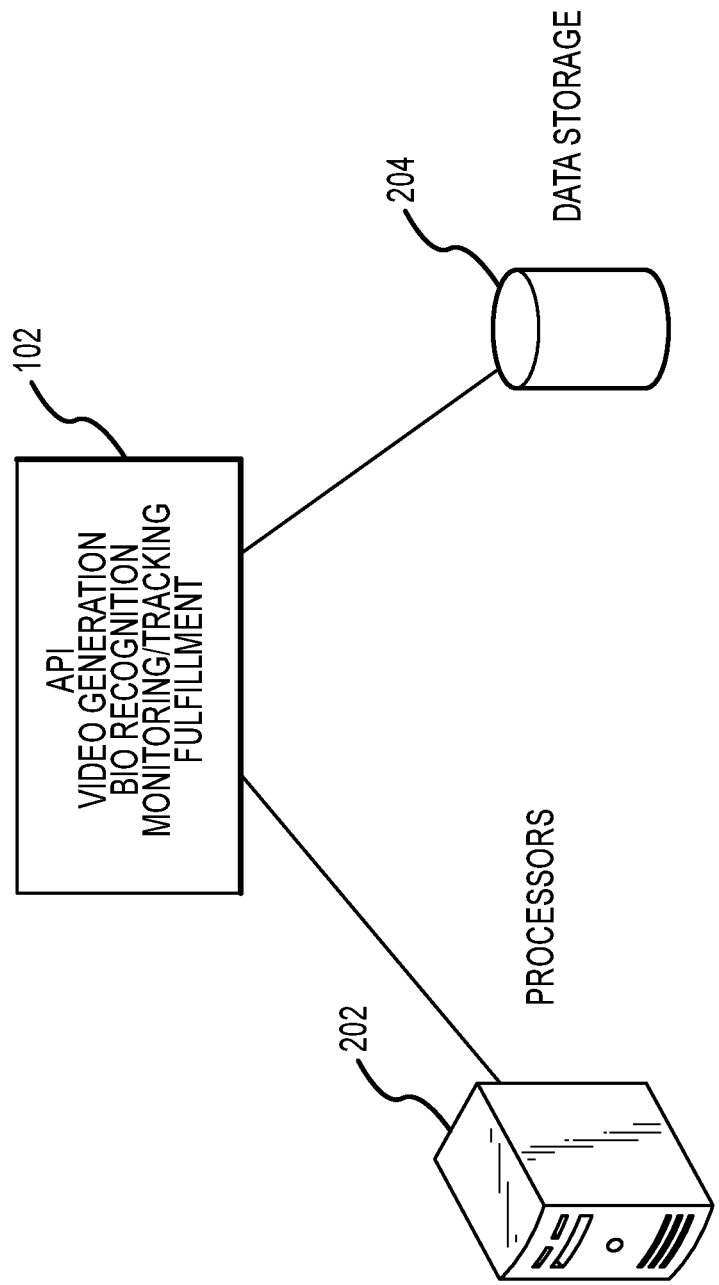

FIG. 2 is a block diagram of an embodiment of the system.

FIG. 2A is part of retina tracking report according to an embodiment of the invention.

FIG. 2B is part of retina tracking report according to an embodiment of the invention.

FIG. 2C is part of retina tracking report according to an embodiment of the invention.

Figure 3:
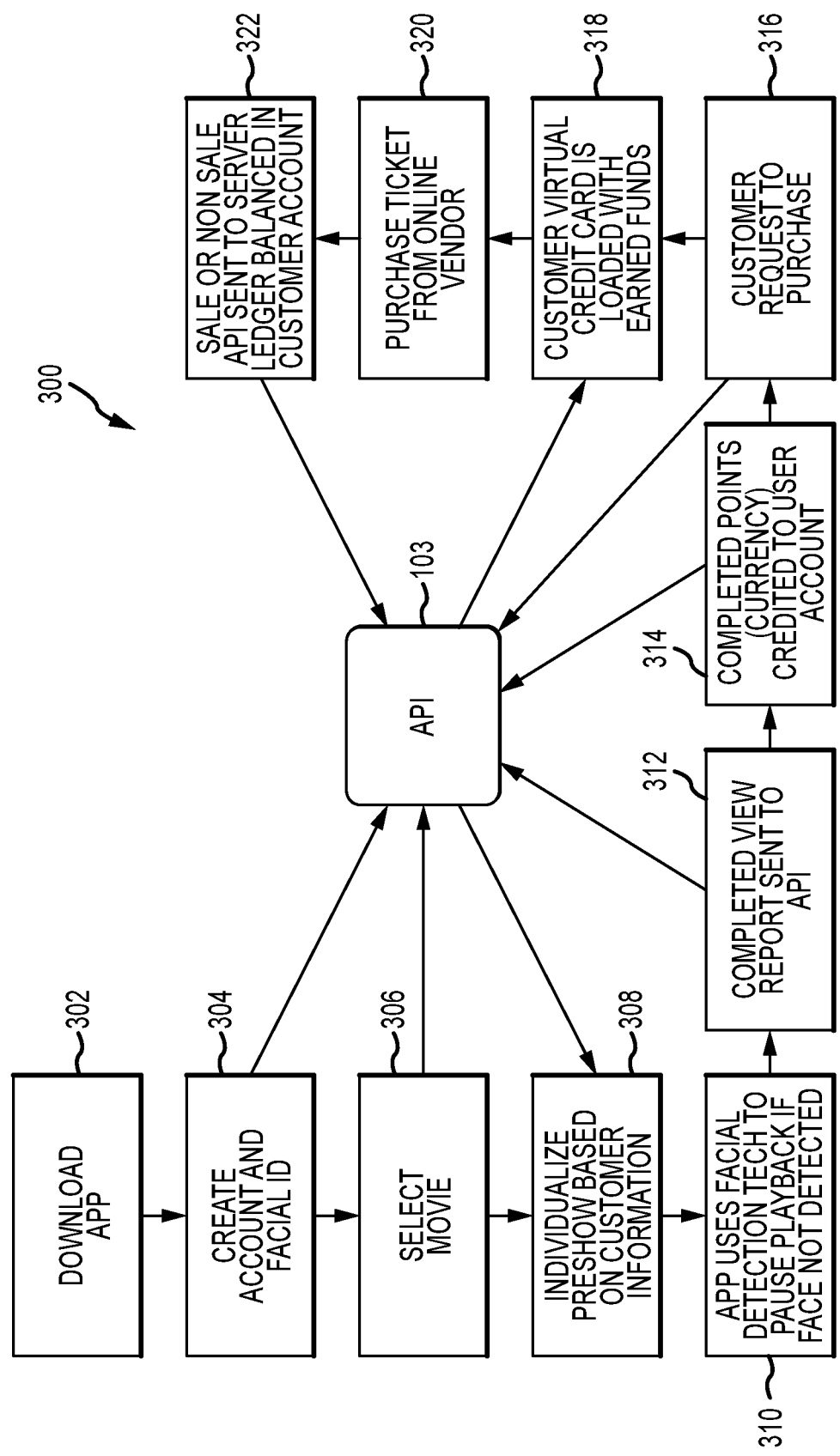

FIG. 3 is a flow diagram illustrating one embodiment of the system.

Figure 4:
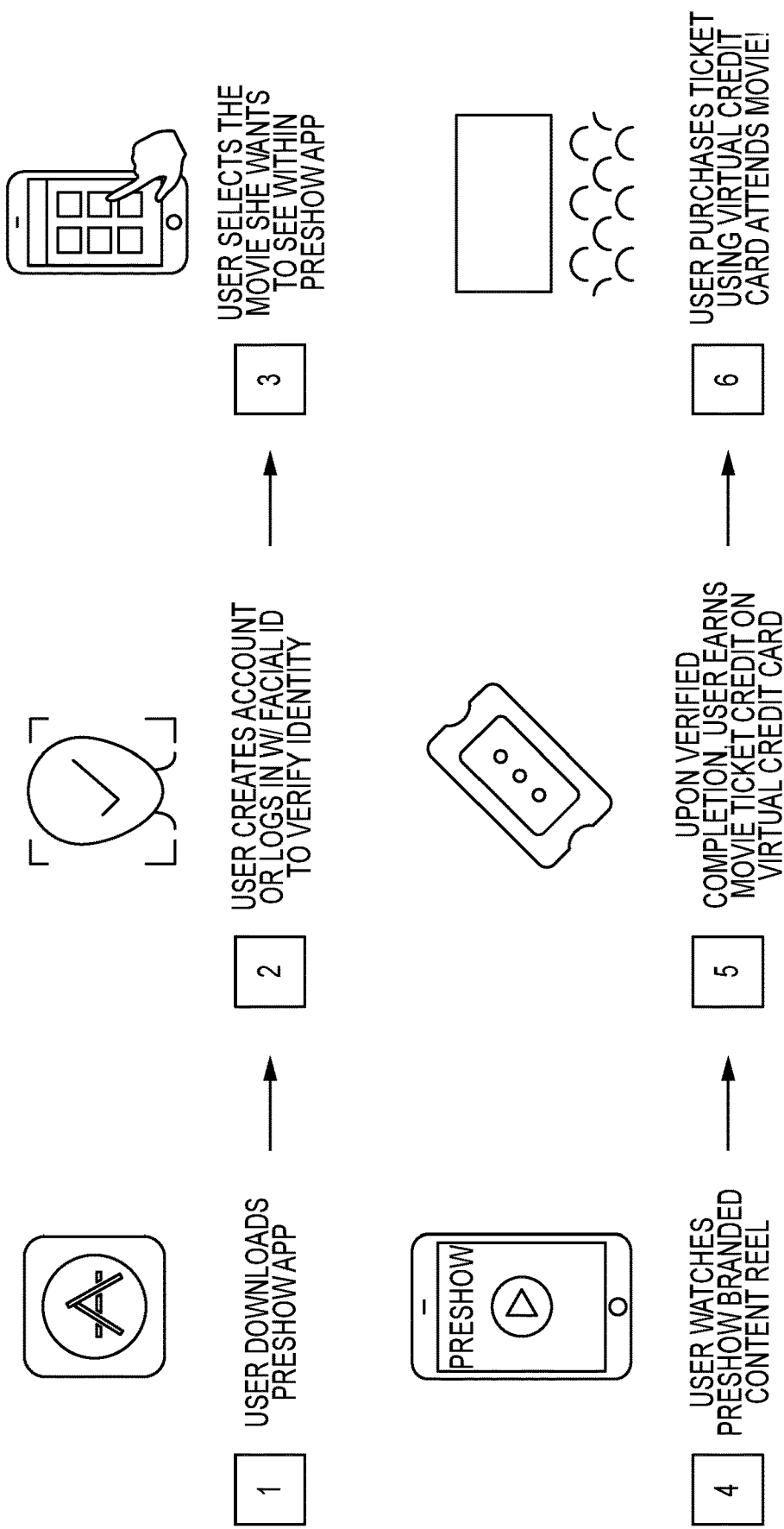

FIG. 4 is a flow diagram illustrating one embodiment of the system.

Figure 5:
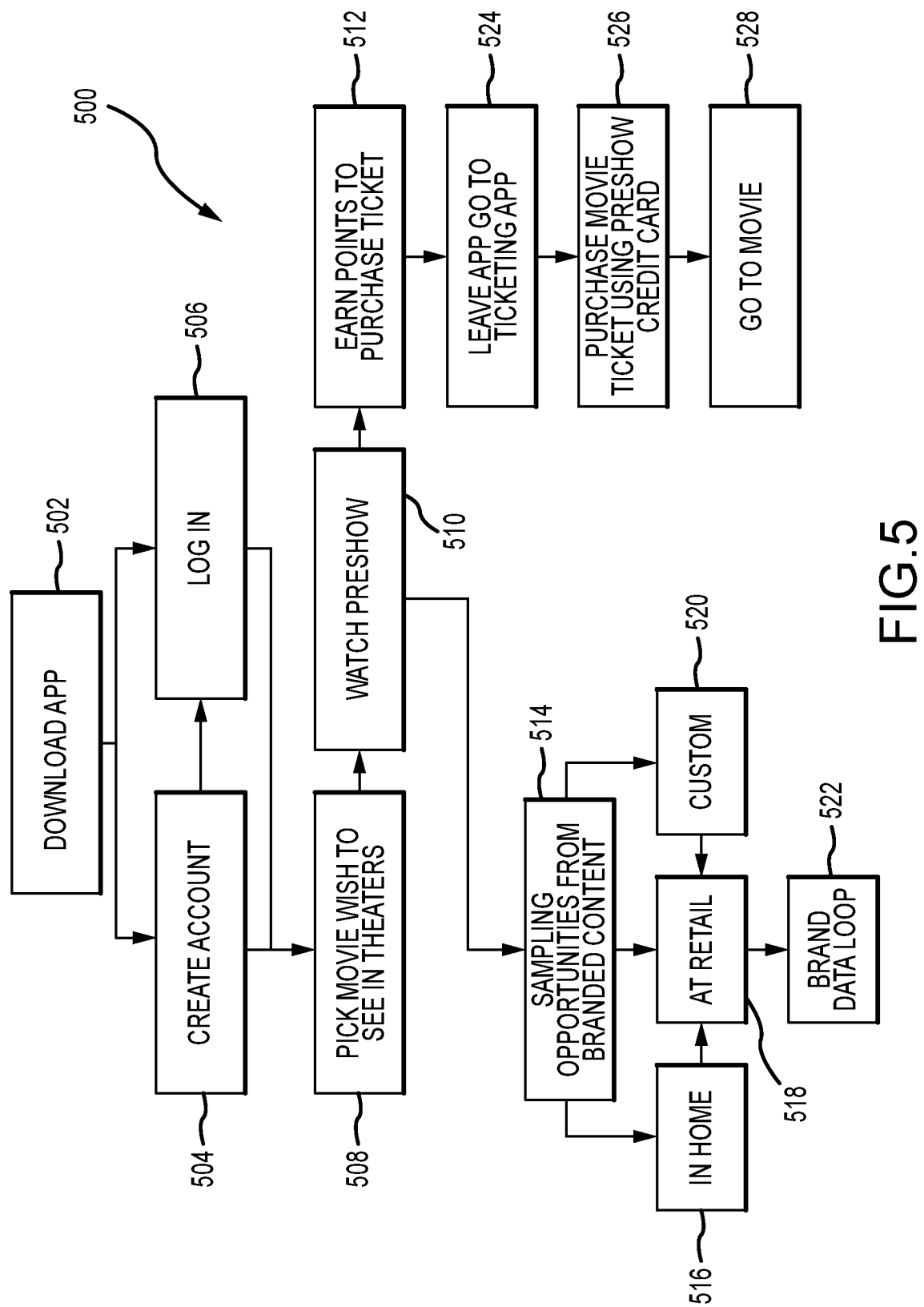

FIG. 5 is a flow diagram illustrating one embodiment of the system.

Figure 6:
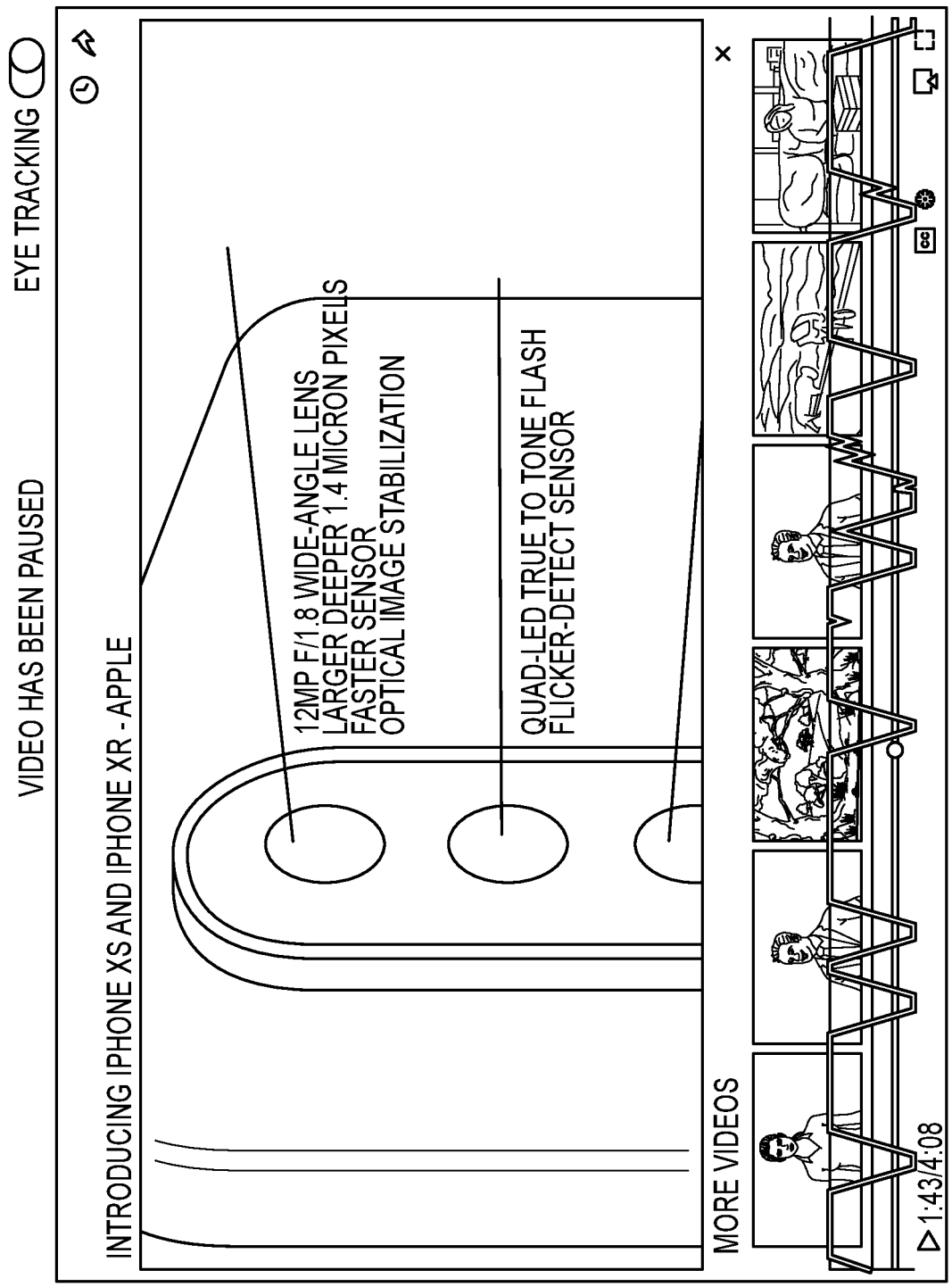

FIG. 6 is a screen shot showing an aspect of one embodiment of the system.

DETAILED DESCRIPTION

Disclosed herein are a method and apparatus for biometrically verifying that users of a video display system are actually watching designated content on the video display system. In an embodiment, content providers interact with an application programming interface (API) of the system to choose content to display. The content providers also designate "rules" for determining whether the user watched the content for a sufficient period of time to receive a reward or benefit. As described in further detail below, a reward or benefit can be a great variety of things including goods, services, and funds. For purpose of this description the term "reward" will be used for any type of reward or benefit. In an embodiment, the system tracks points to determine when a reward has been earned. The system facilitates the user redeeming the points by employing a fulfillment module. The fulfillment module allows content providers to designate the type of reward that can exchanged for points and allows the user to redeem points for the reward. The fulfilment module may interact with fulfilment partners (such as direct suppliers of rewards, or finance entities) to effectuate the reward. A reward can be financial. Financial rewards can be awarded using actual funds transfer, credit to a credit card, transfer of bitcoins, or other. A reward can also be any other type of reward, such as a certificate of attendance, a QR code to be scanned in exchange for a good or service, or any other thing. In an embodiment, content providers also designate a percentage of actual "watching time" to constitute compliance with a predetermined requirement. The API is available whether "online" or "offline" in a commonly understood sense. That is to say, the interactions with the API are stored and available to the user through a downloaded application (app) whether or not the user has online connectivity.

FIG. 1 is a block diagram of an environment 100 within which embodiments of the system operate according to an embodiment. Embodiments of a viewer/listener monitoring system 102, as further described below, communicate with content providers 104. System 102 gives content providers 104 the ability to choose content to be displayed, choose rules for watching the content, and display the content on a variety of venues. For example, a content provider 104 can choose an advertisement to be displayed on a news feed web site on any known user device. Content can include virtual reality digital information. A user who chooses the content is tracked biometrically to determine whether the content is actually watched according to the predetermined rules. If the content is watched, the user obtains a reward. In an embodiment, the user (through user devices 106, which include mobile phones, pads and personal computers) opts into the system 102 by downloading an application so that the user can choose content to watch and take advantage of rewards. In various embodiments, system 102 interacts with fulfillment partners 108 to supply the reward. In an embodiment, fulfillment partners include financial entities that fund a financial vehicle (such as a credit card) to provide cash that the user can spend in exchange for watching the content the user has selected. In various embodiments, fulfillment partners 108 include providers of goods and service who can enable the transfer of the good or service to the user, such as by providing a QR code, or other, token to the user device. The QR code can be scanned to provide the reward. As an example, a user can watch an advertisement displayed by a sporting event or sporting venue in exchange for upgraded seats at a sporting event. This allows owners of the sporting event or venue to maximize venue use. There is no limitation on the variety of types of rewards. In embodiments, user data is collected based on user interaction with the system, and the user data is useable for retargeting content directed at the user, and for analyses of user purchase history. In embodiments, the user can opt into facial recognition that allows sentiment analysis (for example based on the user's facial expression: joy, surprise, sadness, anger, fear, disgust, etc.).

As shown, the elements of environment 100 communicate through network 109, which is typically the internet, but can be any combination of networks large and small, local and global, as is well known in the art.

FIG. 2 is a block diagram of an embodiment of the system 102. System 102 includes an application programming interface (API) through which the system 102 interacts with users, content providers, and the fulfillment module. For purposes of this disclosure, "API" means one of several APIs that are specific to either a user, a content provider, or a fulfillment partner. Supporting the functionalities that are chosen via the API are a video generation module, a biometric recognition module, a monitoring/tracking module, and a fulfillment module.

The video generation module allows content providers to choose content to participate in the methods of system 102.

The biometric recognition module provides functionality that varies depending on embodiments. In one embodiment, the user's eyes are observed to determine when the eyes are actually on the content. Percentage of time looking at the content vs time not looking at the content can be used to discretionally determine an action to take (on the part of the content provider as they choose to configure the system 102 through the API).

FIGS. 2A-2C show pages of a retina tracking report. The report lists an ID for the digital content ("preshow_video_id"), a user ID, a time watched in milliseconds for each date/time an entry is made in the report. The report also lists a brand_id, which in an embodiment is associated with a content provider. The report lists a watch type. Types include one of "watch" (user is watching content), "pause" (content is paused because the user is looking away or because the user paused the content), "play" (the user clicked play), and "completed" (the user completely played the digital content). The report lists a watch_sub_type that includes one of "eye_tracking" (user eyes are being tracked), "user" (this user has initiated an action in the playback, either by interacting with a device or by looking away from the content. The report lists a "watching" metric as a "1" or a "0".

The monitoring/tracking module is configurable to both determine what biometric characteristic to track (for example, eye focus or facial recognition) and how to interpret the resulting data. Again, the behavior of the monitoring/tracking module is configurable by the content provider.

The fulfillment module is responsible for receiving information from the monitoring/tracking module and interacting with any parties to report results of monitoring/tracking, interact with fulfillment partners, and interact with content providers to allow the content providers themselves to take action based on the information.

The system 102 includes multiple processors 202 that execute the method described herein, and data storage facilities 204 as may be required by the system. As is known in the art, processors 202 and data storage facilities 204 can physically exist anywhere.

While verification of user viewing is emphasized in this disclosure, it is also possible in different embodiments to monitor listening by monitoring user device volume.

FIG. 3 is a flow diagram illustrating one embodiment 300 of the system focused on movie previews and the opportunity for users to earn movie tickets by watching previews. This is but one embodiment of the invention that uses movie previews and a financial entity method of reward as an example. However, as previously stated, many other types of digital content can be supplied by content providers, many other types of reward may be available for content consumption, and many other types of fulfillment are effective, in addition to all of those described with reference to FIG. 3.

API 103 communicates with various entities in various capacities. At 302 a user downloads an application (App) to gain access to the system. At 304, the user creates an account and a facial ID. At 306, the user selects a movie the user is interested in. At 308, the user receives an individualized "PreShow" based on information provided by the user (also referred to here as "customer").

At 310, the App uses facial detection technology to pause playback if the facial ID is not detected.

At 312, a completed review report is sent to the API, and at 314 any completed points (which may be currency) are credited to a user account (through interaction with one or more of the fulfillment partners and the content provider).

At 316, the user/customer can request to purchase a ticket using the points credited. At 318, a virtual credit card is loaded with earned funds (i.e., points converted to funds). After 318, the user/customer purchases as movie ticket from any online vendor (320).

At 322, a "sale or no sale" api is sent to a fulfillment partner server, and the user/customer account ledger is balanced.

FIG. 4 is a flow diagram illustrating one embodiment of the system. At 1, the user downloads a "PreShow" app. At 2, the user creates a user account or logs in with facial ID to verify the user's identity. At 3, the user selects a desired movie within the PreShow app. At 4, the user watches PreShow branded content reel. At 5, upon verified completion, the user earns a movie ticket credit on a "virtual" credit card. In an embodiment, a virtual credit card it is a physical credit card that only works when funds have been loaded on the card by the system through the financial partner. At 6, the user purchases a movie ticket using the virtual credit card (which is usable as any other credit card) and attends the movie.

FIG. 5 is a flow diagram illustrating one embodiment 500 of the system. In 500, purchase of movies is described, but this is just one example of the applicability of the invention. In various embodiment, a user can view and choose not only movies to be seen in a theater, but also content provided by streaming services, car rides provided by ride services, etc.

At 502, a user downloads the app according to the system as previously described. At 504, the user creates and account, or if the user has an account, the user logs in at 506.

The user picks a movie to see at 508. The user then watched the PreShow at 510.

As the user watches the PreShow (510) sampling opportunities from various content providers (branded content) is presented at 514. The sampling opportunities can be in home (516), at a retail location (518), or custom (520) as configurable by the content provider. In an embodiment, the sampling opportunities go to a brand data loop 522 that can continue to replay all previous sampling opportunities.

At 512, the user has earned points to purchase a movie ticket. At 524, the user leaves the current (system) app to go to a ticketing app. The user can then purchase a movie ticket using the PreShow "virtual" credit card. Then the user can attend the chosen movie (528).

FIG. 6 is a screen shot showing an aspect of one embodiment of the system. The screen shot illustrates what a user is seeing as the user views content. In this case, the content is advertising content that the user has opted into viewing with the understanding that biometric data will be collected while the user is viewing the content. At the bottom of the screen, the "viewed vs not viewed" data is shown in real time. According to one embodiment, eyes on the content is shown as above the wide horizontal baseline (or >1), while eyes not on content is shown as below the wide horizontal baseline (or <1). The running data is displayed to the use during the display of the content. At the top of the screen is a button that the user can click on to enable or disable eye tracking.

Other embodiments may display the "viewed vs not viewed" data to the user in different visual formats. For example, a border may display a tracker that is color coded—green indicating "watching" and red indicating "not watching".

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Included in the description are flowcharts depicting examples of the methodology which may be used to conduct a goal-directed semantic search. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Accordingly, the disclosure of the present invention is intended to be illustrative, but not limiting, of the scope of the invention, which will be set forth in the forthcoming claims.

What is claimed is:

1. A system for monitoring and tracking consumption of digital content, the system comprising:
   a viewer monitoring system coupled to a plurality of content providers via a network and further coupled to a plurality of users via user devices coupled to the network, wherein the system further comprises,
   an application programming interface (API);
   processors that execute functions of the following modules;
   a video generation module that allows content providers to choose video content; and
   a biometric recognition module that recognizes system users by one or more biometric characteristics, including performing the following functions;
   receiving a user download of a digital application (app) using the API;
   receiving a user selection of content to view; and
   determining whether the user is actually viewing the selected content;
   a monitoring and tracking module that performs the following functions,
   when the user is determined to be actually viewing the selected content, points are credited to the user upon completion of viewing the selected content, wherein the points are redeemable for rewards, wherein rewards are redeemable for a plurality of products and services, and wherein the interaction between the user and the selected content providers is managed by the system; and
   generating an eye tracking report listing an ID for digital content, and a time watched for each ID in the report; and
   when a viewer is viewing digital content displaying viewed vs not viewed data at the bottom of the screen in real time.

2. The system of claim 1, wherein the monitoring and tracking module further comprises the plurality of content providers designating rules for determining when a user will receive points for consuming content.

3. The system of claim 2, wherein the monitoring and tracking module further comprises the system interacting with a financial partner to provide a payment device that is preloaded with funds corresponding to points.

4. The system of claim 2, wherein the plurality of content providers designate a percentage of time watched to constitute compliance with a predetermined requirement.

5. The system of claim 1, wherein the biometric recognition module includes sentiment analysis that analyzes a user's sentiment through facial recognition.

6. The system of claim 1, wherein the biometric recognition module tracks a user's eye to determine whether the user is actually viewing the content.

7. The system of claim 1, wherein the biometric recognition system causes content playback to be paused if the biometric recognition system determines that the user is not viewing content.

8. A computer implemented method for monitoring and tracking consumption of digital content, the method comprising:
   a user downloading an application (app) using a system API;
   the user selecting content to view using the system API;
   a biometric recognition module recognizing system users by one or more biometric characteristics and performing the following functions,
   receiving a user download of a digital application (app) using the API;
   receiving a user selection of content to view; and
   determining whether the user is actually viewing the selected content
   a monitoring and tracking module performing the following functions,
   when the user is determined to be actually viewing the selected content, points are credited to the user upon completion of viewing the selected content, wherein the points are redeemable for rewards, wherein rewards are redeemable for a plurality of products and services, and wherein the interaction between the user and the selected content providers is managed by the system;
   generating an eye tracking report listing an ID for digital content, and a time watched for each ID in the report; and when a viewer is viewing digital content displaying viewed vs not viewed data at the bottom of the screen in real time.

9. The method of claim 8, further comprising a plurality of content providers designating rules for determining when a user will receive points for consuming content.

10. The method of claim 9, further comprising the system interacting with a fulfillment partner to provide a payment device that is preloaded with funds corresponding to points.

11. The method of claim 9, wherein a plurality of digital content providers designate a percentage of time watched to constitute compliance with a predetermined requirement.

12. The method of claim 8, further comprising sentiment analysis that analyzes a user's sentiment through facial recognition.

13. The method of claim 8, further comprising tracking a user's eye to determine whether the user is actually viewing the content.

14. The method of claim 8, further comprising causing content playback to be paused if the system determines that the user is not viewing content.

15. A non-transient computer medium having stored thereon a method that when executed by a computer causes a method to be performed, the method comprising:
   a user downloading an application (app) using a system API;
   the user selecting content to view using the system API;
   a biometric recognition module recognizing system users by one or more biometric characteristics and performing the following functions,
      receiving a user download of a digital application (app) using the API;
      receiving a user selection of content to view; and
      determining whether the user is actually viewing the selected content
   a monitoring and tracking module performing the following functions,
      when the user is determined to be actually viewing the selected content, points are credited to the user upon completion of viewing the selected content, wherein the points are redeemable for rewards, wherein rewards are redeemable for a plurality of products and services, and wherein the interaction between the user and the selected content providers is managed by the system;
   generating an eye tracking report listing an ID for digital content, and a time watched for each ID in the report; and
   when a viewer is viewing digital content displaying viewed vs not viewed data at the bottom of the screen in real time.

16. The non-transient computer medium of claim 15, the method further comprising a plurality of content providers designating rules for determining when a user will receive points for consuming content.

17. The non-transient computer medium of claim 16, the method further comprising the system interacting with a fulfillment partner to provide a payment device that is preloaded with funds corresponding to points.

18. The non-transient computer medium of claim 16, wherein a plurality of digital content providers designate a percentage of time watched to constitute compliance with a predetermined requirement.

19. The non-transient computer medium of claim 15, the method further comprising sentiment analysis that analyzes a user's sentiment through facial recognition.

20. The non-transient computer medium of claim 15, the method further comprising tracking a user's eye to determine whether the user is actually viewing the content.

21. The non-transient computer medium of claim 15, the method further comprising causing content playback to be paused if the system determines that the user is not viewing content.

\* \* \* \* \*